US008378442B2

(12) United States Patent
Fuke (10) Patent No.: US 8,378,442 B2
(45) Date of Patent: Feb. 19, 2013

(54) EPOXY RESIN COMPOSITION FOR OPTICAL SEMICONDUCTOR LIGHT-RECEIVING ELEMENT ENCAPSULATION AND PROCESS FOR PRODUCING THE SAME, AND OPTICAL SEMICONDUCTOR DEVICE

(75) Inventor: Kazuhiro Fuke, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 286 days.

(21) Appl. No.: 12/719,077

(22) Filed: Mar. 8, 2010

(65) Prior Publication Data

US 2010/0224949 A1 Sep. 9, 2010

(30) Foreign Application Priority Data

Mar. 9, 2009 (JP) .................................. 2009-055391

(51) Int. Cl.
*H01L 31/0203* (2006.01)
*C08L 63/00* (2006.01)

(52) U.S. Cl. ................ 257/433; 257/E31.117; 438/127; 523/400; 524/88; 524/612

(58) Field of Classification Search .................. 252/586; 257/433, 788, 789, 790, 795, E21.502, E23.092, 257/E23.119, E23.121, E31.117; 524/612, 524/88; 528/10, 43; 438/127; 523/400
See application file for complete search history.

(56) References Cited

U.S. PATENT DOCUMENTS

| 4,719,502 | A | 1/1988 | Ikeya et al. | |
| 5,641,997 | A * | 6/1997 | Ohta et al. | 257/788 |
| 8,017,670 | B2 * | 9/2011 | Ito et al. | 523/400 |
| 2001/0040283 | A1 | 11/2001 | Konishi et al. | |
| 2002/0048709 | A1 | 4/2002 | Machiguchi et al. | |
| 2006/0292462 | A1 * | 12/2006 | Seo et al. | 430/7 |
| 2008/0114101 | A1 * | 5/2008 | Ito et al. | 524/88 |
| 2010/0041799 | A2 * | 2/2010 | Ito et al. | 524/88 |

FOREIGN PATENT DOCUMENTS

| EP | 0154043 A1 | 9/1985 |
| EP | 1903605 A1 | 3/2008 |
| JP | 2002-14223 A | 1/2002 |
| JP | 2002-69203 A | 3/2002 |
| JP | 2002-69307 A | 3/2002 |
| JP | 2004-006694 A | 1/2004 |
| JP | 2004-352893 | * 12/2004 |
| JP | 2008-24789 A | 2/2008 |
| JP | 2008-101188 A | 5/2008 |
| WO | 99/38902 A1 | 8/1999 |

OTHER PUBLICATIONS

Database WPI Week 19825. Thomson Scientific, London, GB; AN 1982-07024J, XP002591396 & DD 156 498 AI (TESLA NP), Sep. 1, 1982.
Extended European Search Report dated Jul. 28, 2010, issued by the European Patent Office in counterpart European Application No. 10155768.4-1214.
Communication dated Sep. 11, 2012 from the Japanese Patent Office in counterpart Japanese application No. 2009-055391.

* cited by examiner

*Primary Examiner* — Bijan Ahvazi
(74) *Attorney, Agent, or Firm* — Sughrue Mion, PLLC

(57) ABSTRACT

The present invention relates to an epoxy resin composition for optical semiconductor light-receiving element encapsulation, the epoxy resin composition including the following components (A) to (D): (A) an epoxy resin; (B) a curing agent; (C) a curing accelerator; and (D) a yellow colorant, in which the component (D) is contained in a ratio of 0.01% by weight or more based on the whole of the epoxy resin composition.

5 Claims, 4 Drawing Sheets

EPOXY RESIN COMPOSITION FOR OPTICAL SEMICONDUCTOR LIGHT-RECEIVING ELEMENT ENCAPSULATION AND PROCESS FOR PRODUCING THE SAME, AND OPTICAL SEMICONDUCTOR DEVICE

FIELD OF THE INVENTION

The present invention relates to an epoxy resin composition for optical semiconductor light-receiving element encapsulation to be used for encapsulation of a optical semiconductor light-receiving element, the epoxy resin composition having an excellent characteristics intrinsic to an epoxy resin and being capable of blocking any visible light (a short wavelength region), as well as a process for producing the same and an optical semiconductor device encapsulated with a resin using the same.

BACKGROUND OF THE INVENTION

In recent years, products on which an illuminance sensor is mounted have been increased for the purpose of adjusting display brightness or the like in mobile phones, liquid-crystal television sets, and the like. In the illuminance sensor, sensitivity equal to the sensitivity of human eyes is required. However, an optical semiconductor light-receiving element to be used for the illuminance sensor has sensitivity toward not only visible light but also a near-infrared light region of about 800 to 1100 nm and thus perceives near-infrared light, which is imperceptible by human eyes, as it is. As a result, there arises a problem that the sensor falsely judges "bright".

In order to prevent the occurrence of such a problem of the illuminance sensor, for example, it is necessary to block the sensitivity of the optical semiconductor light-receiving element toward the near-infrared light by providing an optical filter or the like on the optical semiconductor light-receiving element. On the other hand, as an encapsulating material for the optical semiconductor light-receiving element, epoxy resin compositions having excellent heat resistance, impact resistance, transparency, and the like have been hitherto widely used.

Thus, in the illuminance sensor as above, for example, there have been performed a method of providing two kinds of optical semiconductor elements different in peak wavelength of light-receiving sensitivity and calculating visible light components based on the difference in light-receiving sensitivity of both elements to compose an illuminance sensor and a method of coating the light-receiving upper surface of the sensor with an optical filter material having a near-infrared light-blocking function and encapsulating the optical filter in the formed state with an epoxy resin composition transparent over a visible light region and a near-infrared light region to form an illuminance sensor (see JP-A-2004-6694).

SUMMARY OF THE INVENTION

However, a part of the optical semiconductor devices such as the illuminance sensors obtained by the above methods have a problem that a sensitivity spectrum of the light-receiving element is not analogous to the human visibility curve and especially, the sensitivity in a short wavelength region of visible light is too high.

The invention has been devised in consideration of such a situation and an object thereof is to provide an epoxy resin composition for optical semiconductor light-receiving element encapsulation capable of obtaining a cured product which efficiently blocks a short wavelength region of visible light and possesses a good light transmitting property in a long wavelength region where the wavelength is longer than the wavelength in the short wavelength region and a process for producing the same, and an optical semiconductor device encapsulated with a resin using the same.

Namely, the present invention relates to the following items (1) to (5).

(1) An epoxy resin composition for optical semiconductor light-receiving element encapsulation, the epoxy resin composition including the following components (A) to (D):
 (A) an epoxy resin;
 (B) a curing agent;
 (C) a curing accelerator; and
 (D) a yellow colorant,
 in which the component (D) is contained in a ratio of 0.01% by weight or more based on the whole of the epoxy resin composition.

(2) The epoxy resin composition for optical semiconductor light-receiving element encapsulation according to (1), in which the yellow colorant as the component (D) is classified into C.I.Solvent in Color Index (C.I.).

(3) A process for producing the epoxy resin composition for optical semiconductor light-receiving element encapsulation according to (1) or (2), the process including:
 blending the following component (D) into an organic solvent (component (E)) in a ratio of 0.01% by weight or more based on the whole of the epoxy resin composition; and
 subsequently blending remaining blend components which include the following components (A) to (C) into the resulting blend:
 (A) an epoxy resin;
 (B) a curing agent;
 (C) a curing accelerator; and
 (D) a yellow colorant.

(4) A process for producing the epoxy resin composition for optical semiconductor light-receiving element encapsulation according to (1) or (2), the process including:
 blending the following component (D) into at least one of the following component (A) and component (B) in a ratio of 0.01% by weight or more based on the whole of the epoxy resin composition; and
 subsequently blending remaining blend components into the resulting blend:
 (A) an epoxy resin;
 (B) a curing agent;
 (C) a curing accelerator; and
 (D) a yellow colorant.

(5) An optical semiconductor device including the epoxy resin composition for optical semiconductor light-receiving element encapsulation according to (1) or (2) and an optical semiconductor light-receiving element encapsulated with the epoxy resin composition.

The present inventors have intensively studied for obtaining a resin composition to be used as an encapsulating material which efficiently blocks a short wavelength region of visible light and possesses a good light transmitting property in a long wavelength region where the wavelength is longer than the wavelength in the short wavelength region. As a result, at blending of a yellow colorant, when a blending amount thereof is set to a specific value or more, they have found out that it becomes possible to obtain a cured product which efficiently blocks a short wavelength region of visible light and possesses a good light transmitting property in a long wavelength region where the wavelength is longer than the wavelength in the short wavelength region and thus they have reached the invention. With regard to the epoxy resin composition of the invention, by blending the yellow colorant into an organic solvent beforehand so as to be in a specific ratio and subsequently blending remaining blend components into the blend or by blending the yellow colorant into at least one of an epoxy resin and a curing agent beforehand so as to be in a specific ratio and subsequently blending remaining blend components into the blend, it becomes possible to blend a specific amount of the yellow colorant into the epoxy resin composition. As a result, not only the composition possesses characteristics of an epoxy resin but also a short wavelength region of visible light is efficiently blocked and a high light transmitting property is imparted in a long wavelength region where the wavelength is longer than the wavelength in the short wavelength region.

Thus, the epoxy resin composition for optical semiconductor light-receiving element encapsulation of the invention contains a yellow colorant (component (D)) in a specific amount together with an epoxy resin (component (A)), a curing agent (component (B)), and a curing accelerator (component (C)). Therefore, the resulting cured product of the epoxy resin composition possesses excellent characteristics (high heat resistance, high adhesiveness, etc.) of an epoxy resin composition. In addition to the characteristics, the cured product effectively blocks a short wavelength region of visible light and possesses a good light transmitting property in a long wavelength region where the wavelength is longer than the wavelength in the short wavelength region.

Also, the epoxy resin composition for optical semiconductor light-receiving element encapsulation of the invention can be produced by blending the yellow colorant (component (D)) into the organic solvent (component (E)) beforehand so as to be in a prescribed ratio and subsequently blending remaining blend components into the blend. Therefore, it becomes possible to blend the yellow colorant (component (D)) in a high concentration and the formation of an aggregate of the above yellow colorant (component (D)) is suppressed and a good dispersibility is imparted.

Moreover, the epoxy resin composition for optical semiconductor light-receiving element encapsulation of the invention can be produced by blending the yellow colorant (component (D)) into at least one of the epoxy resin (component (A)) and the curing agent (component (B)) beforehand so as to be in a prescribed ratio and subsequently blending remaining blend components into the blend. Thus, it becomes possible to add the yellow colorant (component (D)) in the range where light scattering is not induced in a long wavelength region of visible light without precipitating the colorant.

DETAILED DESCRIPTION OF THE INVENTION

The following will describe embodiments for carrying out the invention.

The epoxy resin composition for optical semiconductor light-receiving element encapsulation of the invention (hereinafter also referred to as an "epoxy resin composition") is obtained by using an epoxy resin (component (A)), a curing agent (component (B)), a curing accelerator (component (C)), and a yellow colorant (component (D)) and is used in a liquid form, a powder form, or a form obtained by tabletting the same.

Examples of the epoxy resin (component (A)) include bisphenol-type epoxy resins such as bisphenol A-type epoxy resins, bisphenol F-type epoxy resins, and bisphenol S-type epoxy resins; novolak-type epoxy resins such as phenol novolak-type epoxy resins and cresol novolak-type epoxy resins; nitrogen-containing cyclic epoxy resins such as epoxy resins having an isocyanuric ring skeleton and hydantoin epoxy resins; epoxy resins having an aliphatic hydrocarbon as a skeleton, such as hydrogenated bisphenol A-type epoxy resins, hydrogenated bisphenol F-type epoxy resins, aliphatic epoxy resins, glycidyl ether-type epoxy resins, and alicyclic epoxy resins; epoxy resins which constitute the main stream of low water-absorption cured product types, such as biphenyl-type epoxy resins, dicyclo ring-type epoxy resins, and naphthalene-type epoxy resins. They may be used alone or in combination thereof. Of these epoxy resins, from the viewpoints of excellent transparency and discoloration resistance, bisphenol A-type epoxy resins, bisphenol F-type epoxy resins, novolak-type epoxy resins, alicyclic epoxy resins, and epoxy resins having an isocyanuric ring skeleton are preferably used alone or in combination thereof.

The epoxy resin (component (A)) may be solid or liquid at ordinary temperature and, in general, an average epoxy equivalent of the epoxy resin to be used is preferably from 90 to 1000. In the case of solid one, the softening point is preferably 160° C. or lower. When the epoxy equivalent is too small, the cured product of the epoxy resin composition tends to become brittle. When the epoxy equivalent is too large, the glass transition temperature (Tg) of the cured product becomes low and there is observed a tendency that it becomes difficult to satisfy the heat resistance required for an encapsulating material for optical semiconductor light-receiving elements.

As the curing agent (component (B)) to be used together with the component (A), there may be, for example, mentioned acid anhydride curing agents and phenol curing agents.

As the acid anhydride curing agents, there may be, for example, mentioned phthalic anhydride, maleic anhydride, trimellitic anhydride, pyromellitic anhydride, hexahydrophthalic anhydride, tetrahydrophthalic anhydride, methylnadic anhydride, nadic anhydride, glutaric anhydride, methylhexahydrophthalic anhydride, and methyltetrahydrophthalic anhydride. They may be used alone or in combination thereof. Of these acid anhydride curing agents, it is preferred to use phthalic anhydride, hexahydrophthalic anhydride, tetrahydrophthalic anhydride, and methylhexahydrophthalic anhydride alone or in combination thereof. Moreover, as the acid anhydride curing agent, one having a molecular weight of around 140 to 200 is preferred and also use of a colorless or yellow acid anhydride curing agent is preferred.

In addition, as the phenol curing agents, there may be, for example, mentioned phenol resins such as typical formaldehyde condensed resol-type phenol resins, non-formaldehyde condensed phenol resins, novolak-type phenol resins, novolak-type phenol formaldehyde resins, and polyhydroxystyrene resins; resol-type phenol resins such as aniline-modified resol resins and melamine-modified resol resins; novolak-type phenol resins such as phenol novolak resins, cresol novolak resins, tert-butylphenol novolak resins, nonylphenol novolak resins, and naphtol novolak resins; special phenol resins such as dicyclopentadiene-modified phenol resins, terpene-modified phenol resins, triphenolmethane-type resins, phenolaralkyl resins having a phenylene skeleton or diphenylene skeleton, and naphtolaralkyl resins; and polyhydroxystyrene resins such as poly(p-hydroxystyrene). They may be used alone or in combination thereof.

The blending ratio of the epoxy resin (component (A)) to the curing agent (component (B)) is preferably set to a ratio so that an active group (an acid anhydride group or a hydroxyl group) reactive with an epoxy group in the curing agent becomes from 0.5 to 1.5 equivalents, more preferably 0.7 to 1.2 equivalents with respect to 1 equivalent of the epoxy group in the epoxy resin. When the ratio of the active group is too small, there is observed a tendency that the curing rate of the epoxy resin composition decreases and also the glass transition temperature (Tg) of the cured product becomes low. When the ratio of the active group is too much, a tendency of decrease in moisture resistance is observed.

Moreover, as the curing agent (component (B)), depending on the purpose and applications, other than the above acid anhydride curing agent and phenol curing agent, other curing agents for epoxy resins can be used. As the curing agents for epoxy resins, there may be, for example, mentioned amine curing agents, those obtained by partial esterification of the above acid anhydride curing agents with alcohols, or curing agents of carboxylic acids such as hexahydrophthalic acid, tetrahydrophthalic acid, and methylhexahydrophthalic acid. They may be used alone or in combination thereof. Furthermore, they may be used in combination with the above acid anhydride curing agent and phenol curing agent. For example, in the case where the curing agent of a carboxylic acid is used in combination, the curing rate can be accelerated and thus productivity can be improved. Even in the case of using these curing agents, the blending ratio may be determined according to the blending ratio (equivalent ratio) in the case of using the acid anhydride curing agent and phenol curing agent.

As the curing accelerator (component (C)) to be used together with the above components (A) and (B), there may be, for example, mentioned imidazoles such as 1-benzyl-2-methylimidazole, 1-benzyl-2-phenylimidazole, 2-ethyl-4-methylimidazole, 2-methylimidazole, 2,4-diamino-6-[2'-methylimidazolyl-(1')]-ethyl-s-triazine, 2,4-diamino-6-[2'-undecylimidazolyl-(1')]-ethyl-s-triazine, 2-undecylimidazole, 3-heptadecylimidazole, 2-phenylimidazole, 2-phenylimidazoline, 1,2-dimethylimidazle, 1-cyanoethyl-2-methylimidazole, 1-cyanoethyl-2-ethyl-4-methylimidazole, and 1-cyanoethyl-2-undecylimidazole; tertiary amines such as trimethylamine, triethylamine, dimethylethylamine, N-methylpiperazine, N-aminoethylpiperazine, N,N-dimethylaminocyclohexane, N,N-dimethylcyclohexylamine, N,N-dimethylaminobenzene, N,N-dimethylbenzylamine, 1,8-diazabicyclo[5.4.0]undecene-7, and 1,5-diazabicyclo[4.3.0]nonene-5; and phosphorus compounds such as triphenylphosphine, tribenzylphosphine, and tributylphosphine. In addition, there may be mentioned onium salts and metal salts of the above imidazoles, tertiary amines, and phosphorus compounds and derivatives thereof. They may be used alone or in combination thereof. Of these curing accelerators, an imidazole is preferably used.

The blending amount of the above curing accelerator (component (C)) is preferably set to from 0.01 to 8% by weight, and more preferably set to from 0.1 to 3% by weight based on the above epoxy resin (component (A)). When the blending amount of the curing accelerator (component (C)) is too small, it is difficult to obtain a sufficient curing accelerating effect. Moreover, when the blending amount is too large, a problem of discoloration of the resulting cured product is apt to be obvious.

As the yellow colorant (component (D)) to be used together with the above components (A) to (C), it is preferred to use those classified into C.I.Solvent and those classified into C.I.Pigment in Color Index (C.I.). Specifically, there may be mentioned C.I.Solvent such as C.I.Solvent Yellow 15, C.I.Solvent Yellow 16, C.I.Solvent Yellow 19, C.I.Solvent Yellow 21, C.I.Solvent Yellow 33, C.I.Solvent Yellow 61, and C.I.Solvent Yellow 104; C.I.Pigment such as C.I.Pigment Yellow 1, C.I.Pigment Yellow 2, C.I.Pigment Yellow 3, C.I.Pigment Yellow 83; and the like. They may be used alone or in combination thereof.

Of these, from the viewpoint of the necessity of having strong absorption at a short wavelength side of visible light and showing a good light transmitting property at a longer wavelength side where the wavelength is longer than the wavelength at the short wavelength side, the use of those classified into the C.I.Solvent is preferred due to exhibition of an effect of easily obtaining a higher light transmitting property at a long wavelength side of visible light since it becomes possible to set a large amount of the yellow colorant soluble in the resin as compared with the case of using those classified into C.I.Pigment where an aggregate of the yellow colorant (component (C)) is dispersed.

The blending amount of the above yellow colorant (component (D)) is necessarily set to 0.01% by weight or more based on the epoxy resin composition. Furthermore, it is preferred to set the amount to the range of 0.01 to 10% by weight and particularly preferred is the range of 0.1 to 10% by weight. When the blending amount of the yellow colorant (component (D)) is too small, the short wavelength region of visible light cannot be efficiently blocked. Moreover, when the blending amount of the yellow colorant (component (D)) is too large, excess yellow colorant (component (D)) precipitates to induce light scattering owing to excess of the yellow colorant (component (D)) and there is observed a tendency that a problem of decreasing light transmittance in a long wavelength region takes place. In addition, the light transmittance at a wavelength of 500 nm in the cured product of the epoxy resin composition is preferably from 10% to 95%, more preferably from 20% to 70%, and the light transmittance at a wavelength of 420 nm in the above cured product is preferably 80% or less, more preferably 40% or less, in order to reproduce the visibility curve. In this connection, the above light transmittance herein refers to a value in the case where the thickness of the cured product of the epoxy resin composition is 0.2 mm and the above range of the light transmittance varies depending on the variance of the thickness of the above cured product.

In the region where the wavelength is longer than the wavelength in the short wavelength region to be a target blocking region, in order to obtain a good light transmitting property, the blending amount of the yellow colorant (component (D)) is preferably set to a minimum necessary amount. That is, when the blending amount is too large, as mentioned above, light scattering takes place owing to the precipitation of excess yellow colorant (component (D)) and thus the light transmittance decreases though almost no absorbance is observed on the yellow colorant (component (D)) itself.

In the epoxy resin composition of the invention, at the blending of the yellow colorant (component (D)), it is preferred to blend it in a state that it is dissolved in an organic solvent (component (E)).

As the organic solvent (component (E)), there may be mentioned, for example, ketone solvents such as acetone, methyl ethyl ketone, and diethyl ketone; alcohol solvents such as methanol, ethanol, and isopropyl alcohol; acid solvents such as formic acid, acetic acid, and butyric acid; and ester solvents, e.g., formic acid esters such as methyl formate, ethyl formate, and propyl formate, acetic acid esters such as methyl acetate, ethyl acetate, and propyl acetate, butyric acid esters such as methyl butyrate, ethyl butyrate, and propyl butyrate, and the like. They may be used alone or in combination thereof. In particular, from the viewpoints of industrial availability at a low cost and removing ability by vaporization during the production process of the epoxy resin composition, methanol, ethanol, isopropyl alcohol, acetone, and ethyl acetate may be preferably used alone or in combination thereof. In this connection, it is preferred to finally remove the above organic solvent (component (E)). Most part thereof is vaporized at mixing under heating but it is preferred to perform a treatment such as a pressure-reducing treatment or a treatment where a pulverized product is allowed to stand at a temperature of 60° C. or lower for several hours.

The concentration of the above yellow colorant (component (D)) in the organic solvent (component (E)) at the blending of the yellow colorant (component (D)) into the organic solvent (component (E)) has relation to the blending amount of the yellow colorant (component (D)) relative to the epoxy resin composition but is, for example, set to the range of preferably 0.1 to 20% by weight, particularly preferably 1 to 20% by weight. Namely, when the concentration is too low, a large amount of the organic solvent is necessary for blending a necessary amount of the yellow colorant (component (D)) into the epoxy resin composition and hence there is observed a tendency that it becomes difficult to remove the solvent completely in the subsequent step. When the concentration is too high, there is observed a tendency of occurrence of a problem that the concentration of the yellow colorant (component (D)) becomes too high and reaches a saturated state and thus the colorant precipitates.

In the epoxy resin composition of the invention, at the blending of the above components (A) to (D) or the yellow colorant (component (D)) into the organic solvent (component (E)), the organic solvent (component (E)) is used in addition to the above respective components. For the purpose of complementing the characteristics as the epoxy resin composition blocking a short wavelength region of any visible light and having an excellent light transmitting property in a long wavelength region where the wavelength is longer than the wavelength in the short wavelength region while the characteristics intrinsic to an epoxy resin are retained, other additives such as an antioxidant, a deterioration inhibitor, a modifying agent, a coupling agent, a defoaming agent, a leveling agent, a releasing agent, a colorant other than the above component (D), and a pigment may be appropriately blended.

Moreover, as the antioxidant and deterioration inhibitor, there may be, for example, mentioned phenol compounds, amine compounds, organic sulfur compounds, phosphine compounds, and hindered amine compounds and they may be used alone or in combination thereof. Furthermore, as the modifying agents, there may be, for example, mentioned glycols, silicones, and alcohols. They may be used alone or in combination thereof. As the coupling agent, there may be, for example, mentioned silane coupling agents such as titanate coupling agents, vinyl silane coupling agents, epoxy silane coupling agents, and amino silane coupling agents. Moreover, as the defoaming agent, there may be, for example, mentioned silicone oils. They may be used alone or in combination thereof.

The epoxy resin composition of the invention can be obtained in the form of liquid, powder or a tablet formed through tabletting from the powder, by preparing the composition in the following manner, for example.

In order to obtain a liquid epoxy resin composition, for example, a method of directly adding a prescribed amount of the yellow colorant (component (D)) to the above-described components, i.e., the epoxy resin (component (A)), the curing agent (component (B)), and the curing accelerator (component (C)) can be adopted. Alternatively, as a production process of the liquid epoxy resin composition, from the viewpoints of enabling the high concentration blending of the yellow colorant (component (D)) and suppressing the formation of an aggregate of the yellow colorant (component (D)) to impart a good dispersibility, there can be adopted a method of blending a part or whole amount of the yellow colorant (component (D)) to the organic solvent (component (E)) beforehand so as to be in a prescribed ratio relative to the whole of the epoxy resin composition and subsequently blending the blend together with the remaining blend components. Otherwise, as a production process of the liquid epoxy resin composition, from the viewpoint of enabling the addition of the yellow colorant (component (D)) in the range where light scattering is not induced in a long wavelength region of visible light without precipitation of the yellow colorant (component (D)), there can be adopted a method of blending the yellow colorant (component (D)) to at least one of the epoxy resin (component (A)) and the curing agent (component (B)) beforehand so as to be in a prescribed ratio relative to the whole of the epoxy resin composition and subsequently blending the blend together with the remaining blend components.

On the other hand, in order to obtain the epoxy resin composition in the form of powder or a tablet formed through tabletting from the powder, the epoxy resin composition can be prepared by, for example, appropriately blending the above-described components, preliminarily mixing the components, then kneading and melt mixing the resulting mixture using a kneader, subsequently cooling the resulting mixture to room temperature, and then pulverizing the cooled product by a known method, followed by tabletting the pulverization product, if necessary.

The epoxy resin composition of the invention thus obtained is used as a resin material for encapsulating optical semiconductor light-receiving elements such as an illuminance sensor. A method for encapsulating an optical semiconductor light-receiving element using the epoxy resin composition of the invention is not particularly limited, and the encapsulation may be carried out by a known molding method such as conventional transfer molding, casting, or the like.

When the epoxy resin composition of the invention is liquid, the epoxy resin composition may be used as the so-called two-liquid type such that at least the epoxy resin (component (A)) and the curing agent (component (B)) are stored separately and mixed immediately before use. When the epoxy resin composition of the invention is in the form of powder or a tablet, the above-mentioned components are provided in the state of B stage (semi-cured state) upon melting and mixing of the components, and this product may be heated and melted upon use.

By producing a sheet-shaped or lens-shaped cured product or encapsulating an optical semiconductor light-receiving element using the epoxy resin composition of the invention, a function of blocking a short wavelength region of any target visible light and having a good light transmitting property in a long wavelength region where the wavelength is longer than the wavelength in the short wavelength region can be imparted to the produced cured product or optical semiconductor device while excellent characteristics (high heat resistance, high adhesiveness, etc.) of the epoxy resin composition are retained.

Specifically, as mentioned above, as the cured product of the epoxy resin composition of the invention preferably has a light transmittance of 80% or less in a short wavelength region (e.g., 380 to 420 nm) and a light transmittance ranging from 10 to 100% in a longer wavelength region (e.g., 420 to 780 nm) than the short wavelength region and particularly preferably, the light transmittance is 40% or less in a short wavelength region of visible light and the light transmittance ranges from 20 to 100% in a long wavelength region where the wavelength is longer than the wavelength in the short wavelength region. In this connection, the light transmission can be, for example, obtained by measuring a transmission spectrum using a spectrophotometer and refers to a value in the case where the thickness of the cured product of the epoxy resin composition is 0.2 mm, and the above range of the light transmittance varies depending on the variance of the thickness of the above cured product.

EXAMPLES

Next, the invention will be described with reference to Examples together with Comparative Examples. However, the invention is not limited to these Examples.

The following components were prepared prior to Examples.

Epoxy Resin a: Bisphenol A-type epoxy resin (epoxy equivalent 650)

Epoxy Resin b: Triglycidyl isocyanurate

Curing Agent a: Tetrahydrophthalic anhydride

Curing Agent b: A mixture of 4-methylhexahydrophthalic anhydride and hexahydrophthalic anhydride (mixing weight ratio: 4-methylhexahydrophthalic anhydride/hexahydrophthalic anhydride=70/30)

Curing Accelerator: 2-Ethyl-4-methylimidazole

Organic Solvent Acetone

Yellow colorant a: Spilon Yellow GRLH Special (manufactured by Hodogaya Chemical Co., Ltd.: C.I.Solvent Yellow 21)

Yellow colorant b: Dia Resin Yellow F (manufactured by Mitsubishi Chemical Corporation: C.I.Solvent Yellow 104)

Examples 1 to 6 and Comparative Example 1

Respective components shown in the following Table 1 were blended at the ratios indicated in the table and were melt mixed, whereby objective epoxy resin compositions are prepared. In this connection, as for Example 3, after the yellow colorant was blended into the curing agent and mixed, remaining blend components were blended into the blend to prepare an epoxy resin composition. On the other hand, as for Examples 1, 2, 4, 5, and 6 and Comparative Example 1, after the yellow colorant is blended into the organic solvent (acetone), the blend was mixed with the remaining other blend components to prepare an epoxy resin composition. Almost whole amount of the acetone as the organic solvent was removed by vaporization upon the mixing.

Using each of the epoxy resin compositions thus obtained, it was molded by a transfer molding method at 150° C. for 4 minutes in a dedicated mold (thickness of molding part: 0.2 mm) and post-cured under heating at 150° C. for 3 hours, whereby each of the resin-cured products (thickness: 0.2 mm) were prepared. On the resin-cured product, a transmission spectrum was measured by using a spectrophotometer (V-670 manufactured by JASCO Corporation). The results (curve illustrations showing the relation of ordinate: light transmittance (transmittance) (%/0.2 mm) and abscissa: wavelength (nm)) are shown in FIGS. 1 to 7. FIGS. 1 to 7 show the results on the products of Examples 1 to 6 and Comparative Example 1, respectively.

In the above measurement results, as is apparent from FIGS. 1 to 6, with regard to all the resin cured products of Examples 1 to 6, the amount of the yellow colorant added falls within the range of 0.01 to 10% by weight based on the epoxy resin composition and the products show a light transmittance of 10 to 95% at a wavelength of 500 nm and show a light transmittance of 80% or less at a wavelength of 420 nm.

Figure 1:
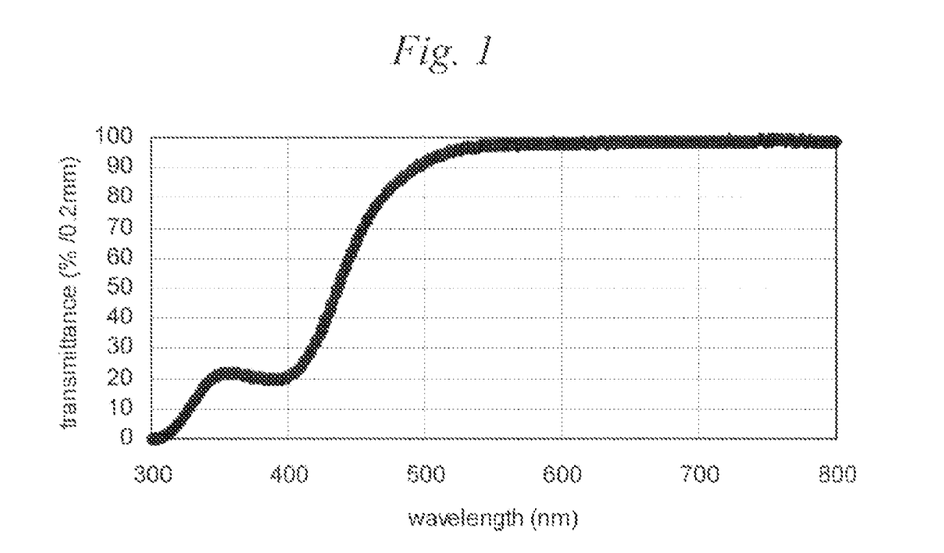
FIG. 1 is a curve illustration showing the relation between light transmittance and wavelength obtained by measuring a transmission spectrum of the resin-cured product of Example 1.
Figure 2:
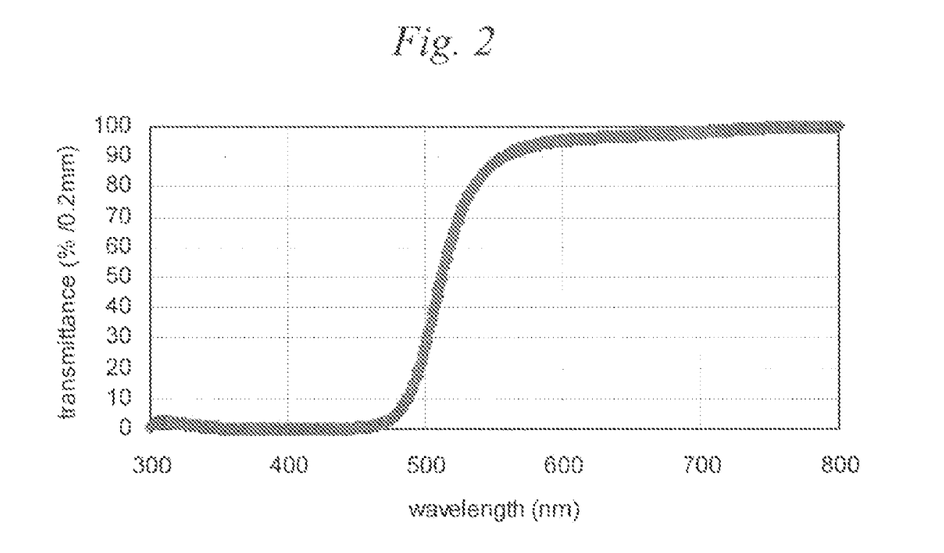
FIG. 2 is a curve illustration showing the relation between light transmittance and wavelength obtained by measuring a transmission spectrum of the resin-cured product of Example 2.
Figure 3:
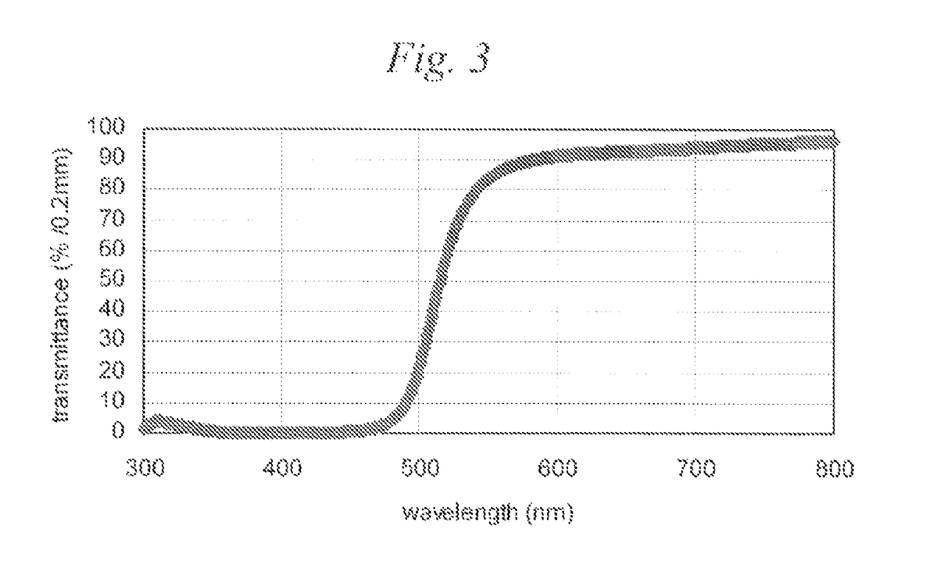
FIG. 3 is a curve illustration showing the relation between light transmittance and wavelength obtained by measuring a transmission spectrum of the resin-cured product of Example 3.
Figure 4:
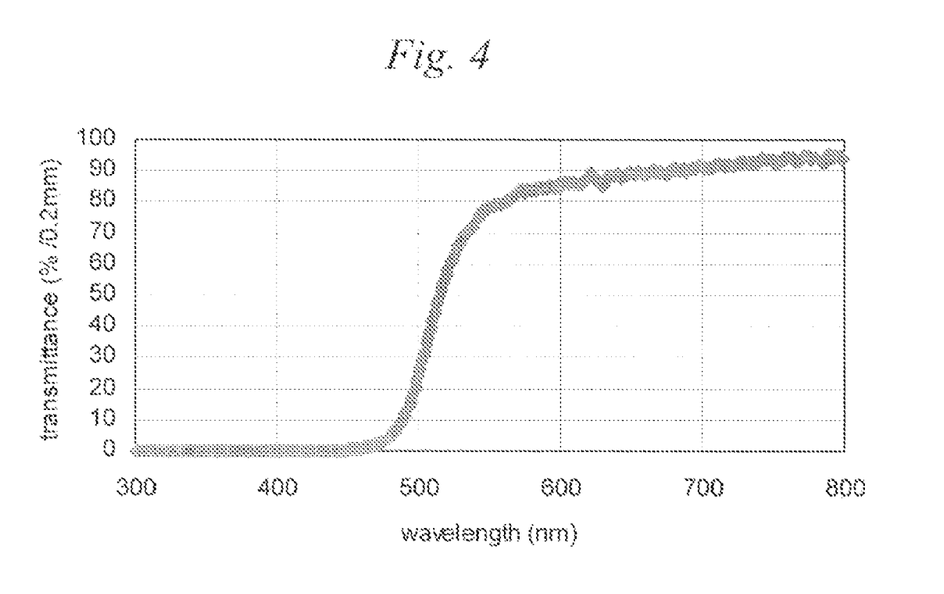
FIG. 4 is a curve illustration showing the relation between light transmittance and wavelength obtained by measuring a transmission spectrum of the resin-cured product of Example 4.
Figure 5:
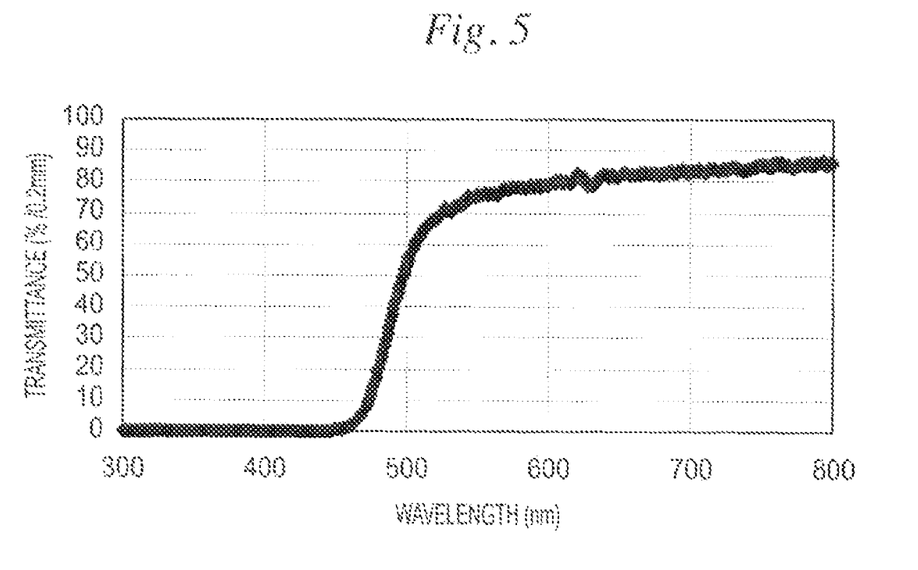
FIG. 5 is a curve illustration showing the relation between light transmittance and wavelength obtained by measuring a transmission spectrum of the resin-cured product of Example 5.
Figure 6:
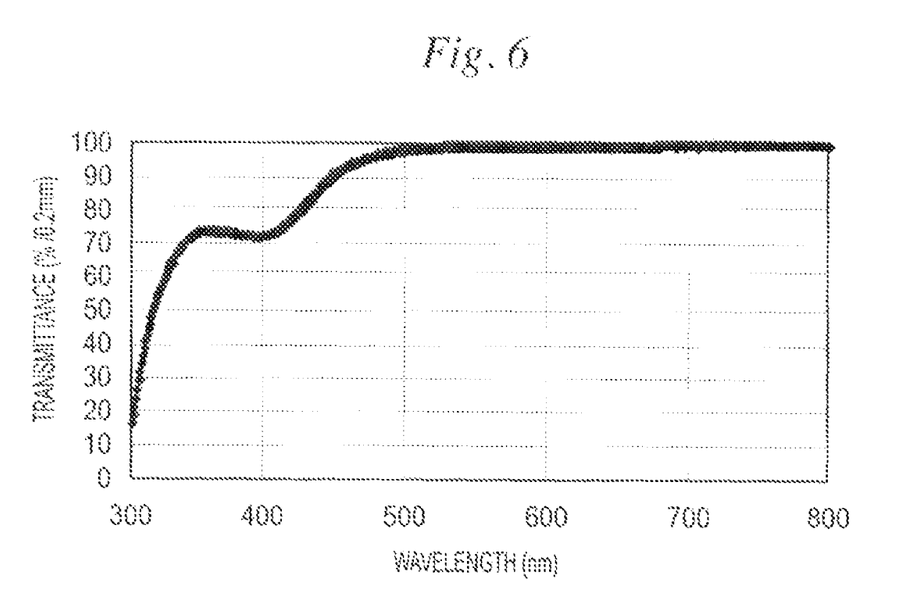
FIG. 6 is a curve illustration showing the relation between light transmittance and wavelength obtained by measuring a transmission spectrum of the resin-cured product of Example 6.
Figure 7:
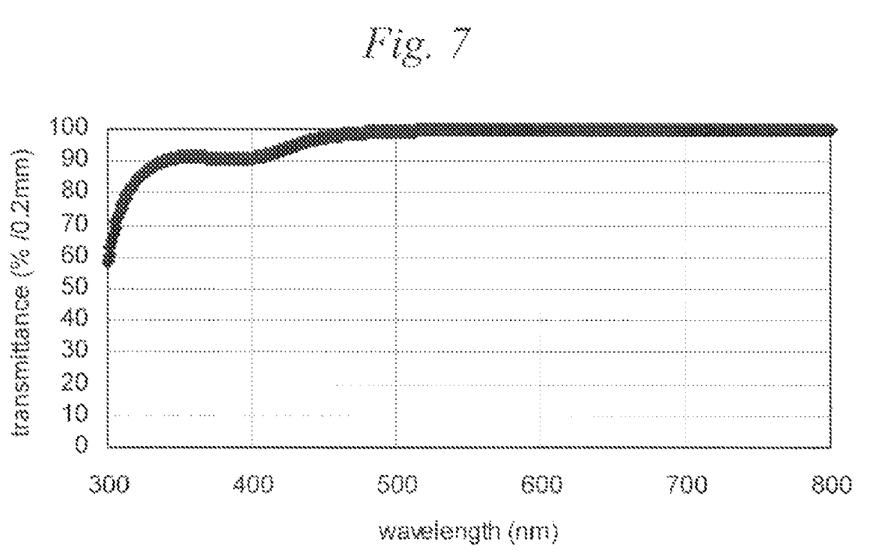
FIG. 7 is a curve illustration showing the relation between light transmittance and wavelength obtained by measuring a transmission spectrum of the resin-cured product of Comparative Example 1.

On the other hand, as is apparent from FIG. 7, with regard to the resin cured product of Comparative Example 7, the amount of the yellow colorant added is 0.001% by weight, which is lower than 0.01% by weight, based on the epoxy resin composition and the product shows a light transmittance of 95% or more at a wavelength of 500 nm and also show a high light transmittance of 80% or more at a wavelength of 420 nm.

Next, using each of the above epoxy resin compositions, a test piece (diameter 50 min×thickness 1 mm) of the cured product was prepared by molding it in a dedicated mold (conditions: 150° C.×4 minutes). Then, the test piece of the cured product was post-cured under heating at 150° C. for 3 hours to finish complete curing. The resulting test piece of the cured product was measured on a differential scanning calorimeter (DSC: DSC-6220 manufactured by Seiko Instruments Inc.) and a middle point of two bending points appearing before and after glass transition temperature was regarded as the glass transition temperature (Tg).

Furthermore, using a test piece of the cured product prepared as above, the presence of an aggregate formed in the test piece of the cured product was confirmed by observing the test piece on a transmission optical microscope. As a result, the test piece in which no aggregate was confirmed was judged and evaluated as Good and the test piece in which a large amount of the aggregate was confirmed was judged and evaluated as Bad.

These results are also shown in the following Table 1.

TABLE 1

| | Example 1 | Example 2 | Example 3 | Example 4 | Example 5 | Example 6 | Comparative Example 1 |
|---|---|---|---|---|---|---|---|
| Epoxy resin a | 80 | 80 | 80 | 80 | 80 | 80 | 80 |
| Epoxy resin b | 20 | 20 | 20 | 20 | 20 | 20 | 20 |
| Curing agent a | 49 | 49 | 25 | 49 | 49 | 49 | 49 |
| Curing agent b | — | — | 27 | — | — | — | — |
| Curing accelerator | 0.5 | 0.5 | 0.5 | 0.5 | 0.5 | 0.5 | 0.5 |
| Organic solvent | 0.63 | 6.3 | — | 65 | 65 | 0.126 | 0.013 |
| Yellow colorant a | 0.075 | 0.75 | 0.76 | 7.8 | — | 0.015 | 0.0015 |
| Yellow colorant b | — | — | — | — | 7.8 | — | — |
| Content of yellow colorant (% by weight) | 0.050 | 0.50 | 0.50 | 5.0 | 5.0 | 0.01 | 0.0010 |
| Glass transition temperature (° C.) | 121 | 116 | 122 | 112 | 114 | 120 | 123 |
| Light transmittance at 500 nm (%) | 92 | 27 | 22 | 24 | 53 | 98 | 99 |
| Light transmittance at 420 nm (%) | 66 | 0 | 0 | 0 | 0 | 79 | 93 |
| Presence of aggregate of yellow colorant inducing light scattering | Good | Good | Good | Good | Good | Good | Good |

From the above results, it is proved that all the resin-cured products obtained possess a characteristic of an epoxy resin with regard to the glass transition temperature (Tg). On the other hand, as mentioned previously, all the resin-cured products of Examples showed a light transmittance of 10 to 95% at a wavelength of 500 nm and also showed a light transmittance of 80% or less at a wavelength of 450 nm. To the contrary, since the resin-cured product of Comparative Example 1 showed a light transmittance of 99% at a wavelength of 500 nm but showed a high light transmittance in a short wavelength region of visible light, such as a light transmittance of 98% at a wavelength of 420 nm, it is proved that the cured product is poor in light-blocking ability in the short wavelength region.

Next, using each of the epoxy resin compositions of the above Examples, an optical semiconductor device was prepared by molding a light-receiving element (1.5 mm×1.5 mm×0.37 mm, a silicon photodiode) with it in a dedicated mold by transfer molding (molding at 150° C. for 4 minutes, post-curing under heating at 150° C. for 3 hours). The optical semiconductor device is a small outline package (SOP) (8 pins) of 4 mm×5 mm having a lead frame where 42 Alloy is silver-plated over a whole surface. The resulting optical semiconductor device exhibited a high reliability with no trouble.

While the invention has been described in detail and with reference to specific embodiments thereof, it will be apparent to one skilled in the art that various changes and modifications can be made therein without departing from the spirit and scope thereof.

This application is based on Japanese Patent Application No. 2009-055391 filed on Mar. 9, 2009, the entirety of which is incorporated herein by way of reference.

The epoxy resin composition of the invention is used as an encapsulation material for optical semiconductor light-receiving elements and provides a cured product which possesses excellent characteristics (e.g., high heat resistance and high adhesiveness) intrinsic to an epoxy resin composition as well as blocks a short wavelength region of visible light and possesses an excellent light transmitting property in a long wavelength region where the wavelength is longer than the wavelength in the short wavelength region.

What is claimed is:

1. An epoxy resin composition for optical semiconductor light-receiving element encapsulation, said epoxy resin composition comprising the following components (A) to (D):
   (A) an epoxy resin;
   (B) a curing agent;
   (C) a curing accelerator; and
   (D) a yellow colorant classified into C.I. Solvent in Color Index (CI), wherein the component (D) is contained in an amount of 0.01% by weight to 10% by weight based on the whole of the epoxy resin composition, wherein the epoxy resin composition has a light transmittance of 80% or less in a short wavelength region of from 380 to 420 nm and a light transmittance ranging from 10 to 100% in a longer wavelength region of from 420 to 780 nm than the short wavelength region when being molded into a 0.2 mm thickness molded object.

2. A process for producing the epoxy resin composition for optical semiconductor light-receiving element encapsulation according to claim 1, said process comprising: blending the following component (D) into (E) an organic solvent in an amount of 0.01% by weight to 10% by weight based on the whole of the epoxy resin composition; and subsequently blending remaining blend components which include the following components (A) to (C) into the resulting blend: (A) an epoxy resin; (B) a curing agent; (C) a curing accelerator; and (D) a yellow colorant.

3. A process for producing the epoxy resin composition for optical semiconductor light-receiving element encapsulation according to claim 1, said process comprising:
   blending the following component (D) into at least one of the following component (A) and component (B) in an amount of 0.01% by weight to 10% by weight based on the whole of the epoxy resin composition; and subsequently blending remaining blend components into the resulting blend:
(A) an epoxy resin;
(B) a curing agent;
(C) a curing accelerator; and
(D) a yellow colorant.

4. An optical semiconductor device comprising the epoxy resin composition for optical semiconductor light-receiving element encapsulation according to claim 1 and an optical semiconductor light-receiving element encapsulated with said epoxy resin composition.

5. The epoxy resin composition according to claim 1, wherein the component (D) is contained in an amount of 0.1% by weight to 10% by weight based on the whole of the epoxy resin composition.

* * * * *